United States Patent
Myers et al.

(10) Patent No.: US 10,832,067 B2
(45) Date of Patent: *Nov. 10, 2020

(54) VEHICLE-WINDOW-TRANSMITTANCE-CONTROL APPARATUS AND METHOD

(71) Applicant: Ford Global Technologies, LLC, Dearborn, MI (US)

(72) Inventors: Scott Vincent Myers, Camarillo, CA (US); Alexandro Walsh, Mountain View, CA (US); Francois Charette, Tracy, CA (US); Lisa Scaria, Milpitas, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 145 days.

This patent is subject to a terminal disclaimer.

(21) Appl. No.: 16/105,646

(22) Filed: Aug. 20, 2018

(65) Prior Publication Data

US 2019/0026574 A1    Jan. 24, 2019

Related U.S. Application Data

(63) Continuation of application No. 15/299,211, filed on Oct. 20, 2016, now Pat. No. 10,192,125.

(51) Int. Cl.
*G06K 9/00* (2006.01)
*G06K 9/46* (2006.01)
(Continued)

(52) U.S. Cl.
CPC ............ *G06K 9/00838* (2013.01); *B60J 3/04* (2013.01); *G02F 1/163* (2013.01);
(Continued)

(58) Field of Classification Search
CPC ........... G06K 9/00221; G06K 9/00302; G06K 9/00308; G06K 9/00315; G06K 9/00335;
(Continued)

(56) References Cited

U.S. PATENT DOCUMENTS

| | | | |
|---|---|---|---|
| 7,360,306 B2 | 4/2008 | Boehm et al. | 29/382 |
| 8,044,784 B2 | 10/2011 | Ghannam et al. | 340/449 |

(Continued)

FOREIGN PATENT DOCUMENTS

| | | | | |
|---|---|---|---|---|
| EP | 2583847 A1 | 4/2013 | | B60J 3/04 |
| JP | 2002331835 A | 11/2002 | | B60J 3/04 |

(Continued)

OTHER PUBLICATIONS

Solar Power Windows Ready for Production | PlanetSave , Sep. 5, 2015 http://planetsave.com/2015/09/05/solarpowerwindowsreadyforproduction/.

*Primary Examiner* — Andrew W Johns
(74) *Attorney, Agent, or Firm* — David R. Stevens; Stevens Law Group

(57) ABSTRACT

A vehicle is disclosed that includes systems for adjusting the transmittance of one or more windows of the vehicle. The vehicle may include a camera outputting images taken of an occupant within the vehicle. The vehicle may also include an artificial neural network running on computer hardware carried on-board the vehicle. The artificial neural network may be trained to classify the occupant of the vehicle using the images captured by the camera as input. The vehicle may further include a controller controlling transmittance of the one or more windows based on classifications made by the artificial neural network. For example, if the artificial neural network classifies the occupant as squinting or shading his or her eyes with a hand, the controller may reduce the transmittance of a windshield, side window, or some combination thereof.

20 Claims, 7 Drawing Sheets

(51) Int. Cl.
*G06K 9/62* (2006.01)
*G06N 3/04* (2006.01)
*G06N 3/08* (2006.01)
*B60J 3/04* (2006.01)
*G02F 1/163* (2006.01)
*G06K 9/66* (2006.01)

(52) U.S. Cl.
CPC ..... *G06K 9/00791* (2013.01); *G06K 9/00845* (2013.01); *G06K 9/4619* (2013.01); *G06K 9/4628* (2013.01); *G06K 9/6273* (2013.01); *G06K 9/6277* (2013.01); *G06K 9/66* (2013.01); *G06N 3/0445* (2013.01); *G06N 3/08* (2013.01); *G06N 3/084* (2013.01)

(58) Field of Classification Search
CPC ........... G06K 9/00832; G06K 9/00845; G06K 9/6279; G06K 9/628; G02F 1/163; B60J 3/04
See application file for complete search history.

(56) References Cited

U.S. PATENT DOCUMENTS

| | | | |
|---|---|---|---|
| 8,102,586 B2 | 1/2012 | Albahri | 356/265 |
| 8,781,676 B2 | 7/2014 | McIntyre, Jr. et al. | 701/36 |
| 10,192,125 B2 * | 1/2019 | Myers et al. | G06K 9/4619 |
| 2003/0227663 A1 | 12/2003 | Agrawal et al. | 359/265 |
| 2008/0230653 A1 * | 9/2008 | Mitchell et al. | B60J 3/04 244/129.3 |
| 2009/0109036 A1 * | 4/2009 | Schalla et al. | B64D 11/0015 340/573.1 |
| 2010/0065721 A1 * | 3/2010 | Broude et al. | B60J 3/04 250/201.1 |
| 2011/0286644 A1 * | 11/2011 | Kislal | G06T 7/0012 382/128 |
| 2012/0256080 A9 | 10/2012 | Mikat | 250/214 R |
| 2014/0148996 A1 | 5/2014 | Watkins | B60J 3/04 |
| 2014/0210625 A1 * | 7/2014 | Nemat-Nasser | G08B 21/06 340/575 |
| 2014/0320946 A1 * | 10/2014 | Tomkins et al. | B60J 3/04 359/275 |
| 2015/0098121 A1 | 4/2015 | Turnbull et al. | G02F 1/163 |
| 2016/0214467 A1 | 7/2016 | El Idrissi et al. | B60J 3/04 |
| 2016/0227148 A1 * | 8/2016 | Griffith | G01N 25/72 |
| 2017/0096098 A1 * | 4/2017 | Korthauer et al. | B60K 37/06 |
| 2017/0171375 A1 * | 6/2017 | Kamata | B60W 50/082 |
| 2017/0217445 A1 * | 8/2017 | Tzirkel-Hancock et al. | B60T 7/12 |

FOREIGN PATENT DOCUMENTS

| | | | | |
|---|---|---|---|---|
| JP | 2005035384 A | | 2/2005 | B60J 3/04 |
| JP | 2007076396 A | | 3/2007 | B60J 3/04 |
| JP | 2007091081 A | | 4/2007 | B60J 3/04 |
| RU | 2369490 C2 | | 10/2009 | B60J 3/04 |
| WO | WO 99/44846 | | 9/1999 | B60J 3/04 |

* cited by examiner

VEHICLE-WINDOW-TRANSMITTANCE-CONTROL APPARATUS AND METHOD

CROSS REFERENCE TO RELATED PATENT APPLICATION

The present application is a continuation of U.S. patent application Ser. No. 15/299,211, filed on Oct. 20, 2016, which is incorporated by reference in its entirety.

FIELD OF THE INVENTION

This invention relates to vehicular systems and more particularly to systems and methods for using image-based classifications of one or more occupants of a vehicle as a basis for adjusting the transmittance of one or more windows of the vehicle.

BACKGROUND OF THE INVENTION

Light conditions in an environment surrounding a vehicle may adversely affect a driver of that vehicle. For example, sunlight passing through a windshield of a vehicle may impair the ability of a driver to see what is ahead of the vehicle. Conversely, a windshield or other vehicular window that is permanently tinted to filter out significant amounts of sunlight may filter out too much to be suitable for lower light conditions. Accordingly, what is needed is a vehicular system and method for adjusting window transmittance to meet the immediate needs of a driver or other occupant of the vehicle.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Figure 1:
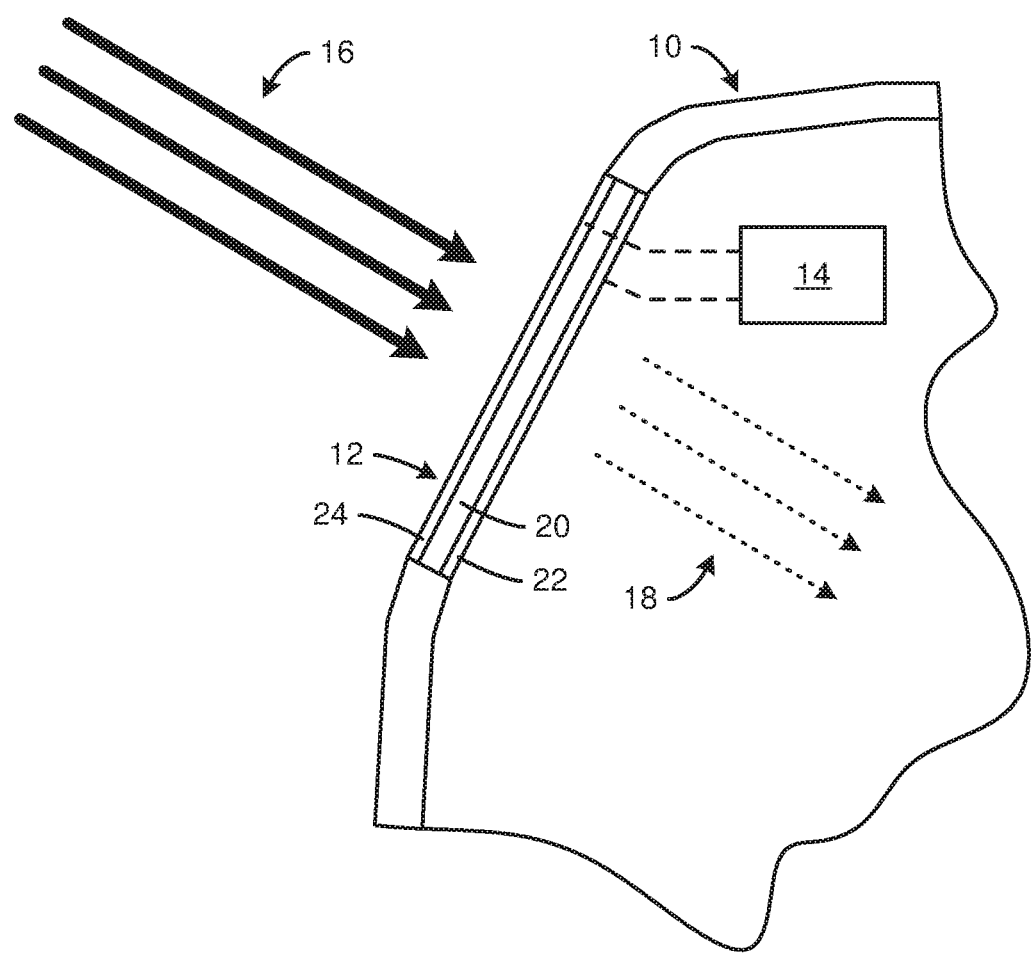
FIG. 1 is a schematic diagram illustrating one embodiment of a window with variable transmittance in accordance with the present invention.

Referring to FIG. 1, the real world presents an array of lighting conditions that are ever changing. This reality creates significant challenges for drivers and other occupants of vehicles. For example, at one moment a driver may be driving in shadow with his or her eyes adjusted to that condition. A moment later, the driver may be exposed to a direct view of the sun through his or her windshield. This sudden change may, for some seconds, render the driver incapable of accurately viewing the road ahead. Moreover, to address this sudden change in lighting, a driver may squint his or her eyes and/or remove a hand from a steering wheel to shade his or her eyes, deploy a sun visor, don a pair of sunglasses, or the like. Thus, in a moment of reduced visibility, a driver may also be physically distracted and/or required to perform additional tasks.

To overcome these challenges, a vehicle 10 in accordance with the present invention may be equipped with one or more windows 12 (e.g., a windshield, a rear window, one or more side windows, a sunroof, or the like or a combination or sub-combination thereof) having variable transmittance and a computer system 14 for controlling the transmittance of the one or more windows 12. Transmittance may define the ability of a window 12 to transmit radiant energy therethrough. Transmittance may be expresses as a percentage of the incident radiant flux 16 that passes through a window 12 to become transmitted radiant flux 18. Thus, a transmittance near one hundred percent would correspond to a window 12 that lets substantially all incident light 16 pass therethrough, while a transmittance near zero would correspond to a window 12 that lets substantially no incident light 16 therethrough.

A window 12 with variable transmittance may be selectively adjusted or controlled within a particular transmittance range or between multiple transmittance states. For example, in certain embodiments, for light within a particular spectral band (e.g., visible light, UV light, or the like or a combination thereof), the transmittance range of a window 12 in accordance with the present invention may extend from a maximum of about 80% to a minimum of about 0.1%. In other embodiments, for light within a particular spectral band (e.g., visible light, UV light, or the like or a combination thereof), the transmittance range of a window 12 in accordance with the present invention may extend from a maximum of about 65% to a minimum of about 0.1%. In selected embodiments, the transmittance of a window 12 in accordance with the present invention may be infinitely tunable (i.e., by a system 14) within its transmittance range. In other embodiments, the transmittance of a window 12 in accordance with the present invention may be transitioned (i.e., by a system 14) between discrete transmittance states.

A window 12 may provide variable transmittance in any suitable manner. In selected embodiments, a window 12 may include different components or layers that perform different functions. For example, in certain embodiments, a window 12 may include a structural component 20 or layer 20 and a transmittance component 22 or layer 22. A structural component 20 may provide the structural strength of a window 12. In selected embodiments, a structural component may be or comprise glass (e.g., laminated glass), a transparent polymeric material, or the like. A transmittance component 22 may provide, based on different inputs provided thereto, different levels of transmittance.

In certain embodiments or for certain windows 12 of a vehicle 10, a transmittance component 22 may be or comprise an electrochromatic layer that changes light transmission properties in response to changes in a voltage applied thereto. Accordingly, by controlling a voltage applied to the electrochromatic layer, a system 14 may control the transmittance of the corresponding window 12. In other embodiments or for other windows 12 of a vehicle 10, a transmittance component 22 may be or comprise a suspended particle device, polymer dispersed liquid crystal device, micro blind, nanocrystal device, or the like.

In addition to a structural component 20 and a transmittance component 22, a window 12 in accordance with the present invention may also include a photovoltaic component 24 or layer 24. For example, a window 20 may include a layer of photovoltaic material (e.g., a transparent photovoltaic material, a semi-transparent photovoltaic material that itself provides a certain level of tinting, or the like) extending across all or some portion of a window 12. In selected embodiments, the electrical power produced by a photovoltaic component 24 may be used to power a transmittance component 22. Alternatively, or in addition thereto, the voltage produced by a photovoltaic component 24 may be used as a measure of the amount of light incident on the corresponding window 12. That is, the more light and the more direct the light (i.e., the more orthogonal the light rays with respect to the corresponding window 12), the higher may be the voltage output by the photovoltaic component 24. Thus, a photovoltaic component 24 may be a power generator, a light sensor, or a combination thereof.

The various components of a window 12 may be arranged in any suitable manner. For example, in one embodiment, a photovoltaic component 24 may be positioned on an exterior surface of a structural component 20, while a transmittance component 22 may be positioned on an interior surface of a structural component 20. Alternatively, one or both of a transmittance component 22 and a photovoltaic component 24 may be positioned between (and thus protected by) two or more layers of a structural component 20.

A system 14 in accordance with the present invention may connect to a transmittance component 22 and/or photovoltaic component 24 in any suitable manner. In selected embodiments, a system 14 may connect to opposing "busbars" of opposite polarity that are deposited or otherwise adhered to a transmittance component 22 in order to apply a voltage to the transmittance component 22. Similarly, a system 14 may connect to opposing busbars of opposite polarity that are deposited or otherwise adhered to a photovoltaic component 24 in order to sense a voltage generated by the photovoltaic component 24. Such busbars may be positioned on the periphery of a window 12 where they may be hidden from view (e.g., within a glass run channel, within a vehicle door, or the like) or minimally interfere with the view into or out of the window 12 or the aesthetics of the corresponding vehicle 10.

Figure 2:
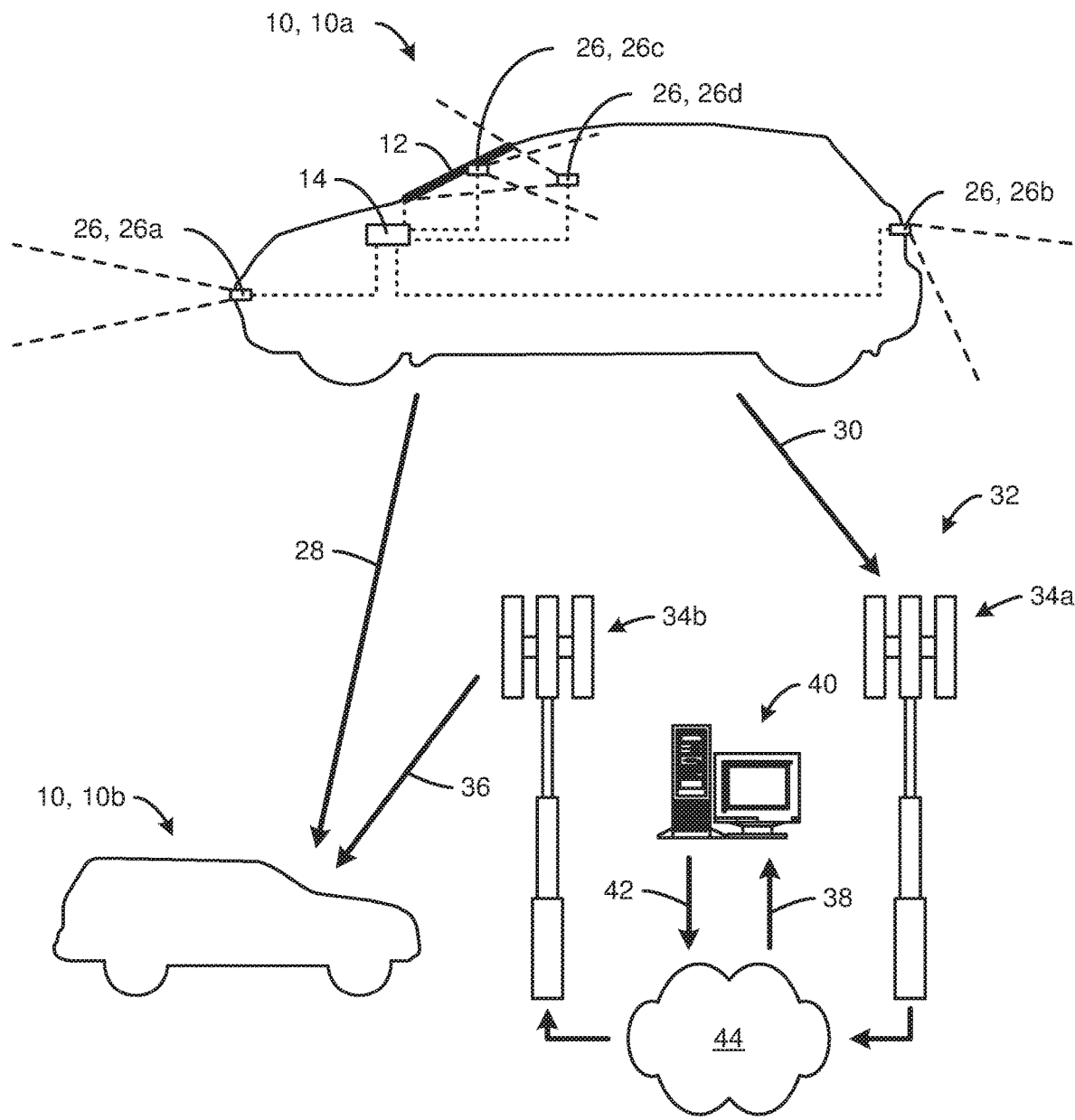
FIG. 2 is a schematic diagram illustrating one embodiment of the technological context within which a system for controlling window transmittance in accordance with the present invention may operate.

Referring to FIG. 2, in selected embodiments, a vehicle 10 may include one or more sensors 26. A system 14 in accordance with the present invention may use the outputs of one or more such sensors 26 to determine how best to control the transmittance of one or more windows 12. The sensors 26 included within a vehicle 10 may take any suitable form. For example, one or more sensors 26 may comprise cameras, light sensors, photovoltaic components 24, temperature sensors, or the like. Accordingly, a system 14 may adjust the transmittance of one or more windows 12 in order to control an amount of transmitted radian flux 18, a temperature within a cabin of a corresponding vehicle 10, or the like or a combination thereof.

In selected embodiments, a system 14 in accordance with the present invention may control more that the transmittance of one or more windows 12. For example, a system 14 may control the height of one or more seats within a vehicle 10. Accordingly, should the data from one or more sensors 26 indicate that an occupant (e.g., a passenger) is receiving inadequate shade from a sun visor or the like, a system 14 may instruct a corresponding seat to elevate an occupant sufficient for his or her eyes to be adequately shaded by the sun visor.

In certain embodiments, one or more image sensors 26 in accordance with the present invention may be forward-facing cameras 26a (e.g., cameras directed to an area ahead of a vehicle 10), rearward-facing cameras 26b (e.g., back-up cameras or cameras directed to an area behind a vehicle 10), occupant cameras 26c (e.g., cameras directed toward or capturing images of one or more of a driver, passenger, backseat passenger, or the like), point-of-view cameras 26d (e.g., cameras capturing a driver's or other occupant's point of view of and/or through a windshield or other window), or the like or a combination or sub-combination thereof.

Image data (e.g., video) captured by one or more sensors 26 may be processed by a system 14 as individual images or frames. For example, an artificial neural network within a system 14 may be fed images or frames captured by one or more sensors 26. The artificial neural network may take such images or frames into consideration as it determines which class (e.g., which occupant characteristic) is represented therein. Accordingly, a system 14 may control the transmittance of one or more windows 12 in accordance with classifications made by an artificial neural network.

In selected embodiments, an artificial neural network corresponding to a system 14 in accordance with the present invention may analyze multiple consecutive images captured by a sensor 26 over a short period of time (e.g., several images captured over a period of a few seconds). If a significant majority of the images are indicative of a first condition (e.g., transmitted radiant flux 18 above a threshold, transmitted radiant flux 18 below a threshold, a driver squinting, a driver shading eyes with a hand, a driver wearing sunglasses, or the like), a system 14 may be more likely to determine that the first condition is present.

In certain embodiments, the classifications performed by an artificial neural network may occur in real time with the capturing of the sensor data upon which the classification is based. That is, an artificial neural network may quantify the correspondence of particular sensor data (e.g., image data) to one or more classes within a very short period of time after the capture of that particular sensor data by one or more sensors 26. In selected embodiments, that very short period of time may be about 10 seconds or less, 5 seconds or less, 2 seconds or less, or the like.

In selected embodiments, one or more classifications performed by a system 14 in accordance with the present invention may be agnostic to any particular feature contained within the one or more images captured by any sensor 26. That is, an artificial neural network within a system 14 may not search image data corresponding to one or more sensors 26 for any particular feature. Rather, an artificial neural network may judge whether all the image data received thereby taken as a whole is more indicative of one class or another.

This agnosticism of a system 14 in accordance with the present invention may provide significant advantages. For example, each image may be examined or analyzed "as is." That is, there may be no need for image pre-processing for a system 14 to function properly. Furthermore, no additional calibration may be needed. Moreover, an artificial neural network may use one or more images in its classification process without regard to whether a sensor 26 that captured the one or more images was fixed in an exact location with respect to its target.

In selected embodiments, information characterizing certain lighting conditions may be passed or communicated from a system 14 on-board a vehicle 10 to some hardware located off-board the vehicle 10. That is, information about lighting may be passed vehicle-to-vehicle (V2V), vehicle-to-infrastructure (V2I), vehicle-to-everything (V2X), or the like or a combination or sub-combination thereof. For example, information generated or collected by a system 14 on-board one vehicle 10a may be passed to one or more other vehicles 10b that are nearby. Accordingly, information generated or collected by one vehicle 10a may be used (e.g., wholly adopted or taken into consideration) by systems 14 on-board one or more other vehicles 10b.

In selected embodiments, information about lighting may be passed 28 directly from one vehicle 10a to another vehicle 10b (e.g., via a radio transmission). Alternatively, information about lighting may be fed 30 by a system 14 on-board a vehicle 10a into a communication system 32 (e.g., a communication system 32 comprising stationary telecommunication infrastructure). For example, a system 14 may feed 30 information about lighting into a cellular telephone network by sending one or more signals to a nearby cellular tower 34a. In selected embodiments, information fed 30 in by a system 14 may be routed through a communication system 32 and delivered 36 to corresponding systems 14 of one or more other vehicles 10b. Alternatively, information fed 30 into a communication system 32 by a system 14 may be delivered 38 to a computer system 40, processed by the computer system 40, fed 42 by the computer system 40 back into the communications system 32, and delivered 36 to corresponding systems 14 of one or more other vehicles 10b.

For example, in selected embodiments, a communication system 32 may include a cellular telephone network comprising a first cellular tower 34a located near a first vehicle 10a, a second cellular tower 34b located near a second vehicle 10b, and a network 44 connecting the first cellular tower 34a to the second cellular tower 34b. A computer system 40 may also connect to the network 44. Accordingly, information fed 30 into the cellular telephone network by a system 14 corresponding to the first vehicle 10a may be received by the computer system 40 so that it can be recorded and/or processed and distributed to one or more other vehicles 10b, or the like or a combination or sub-combination thereof.

Figure 3:
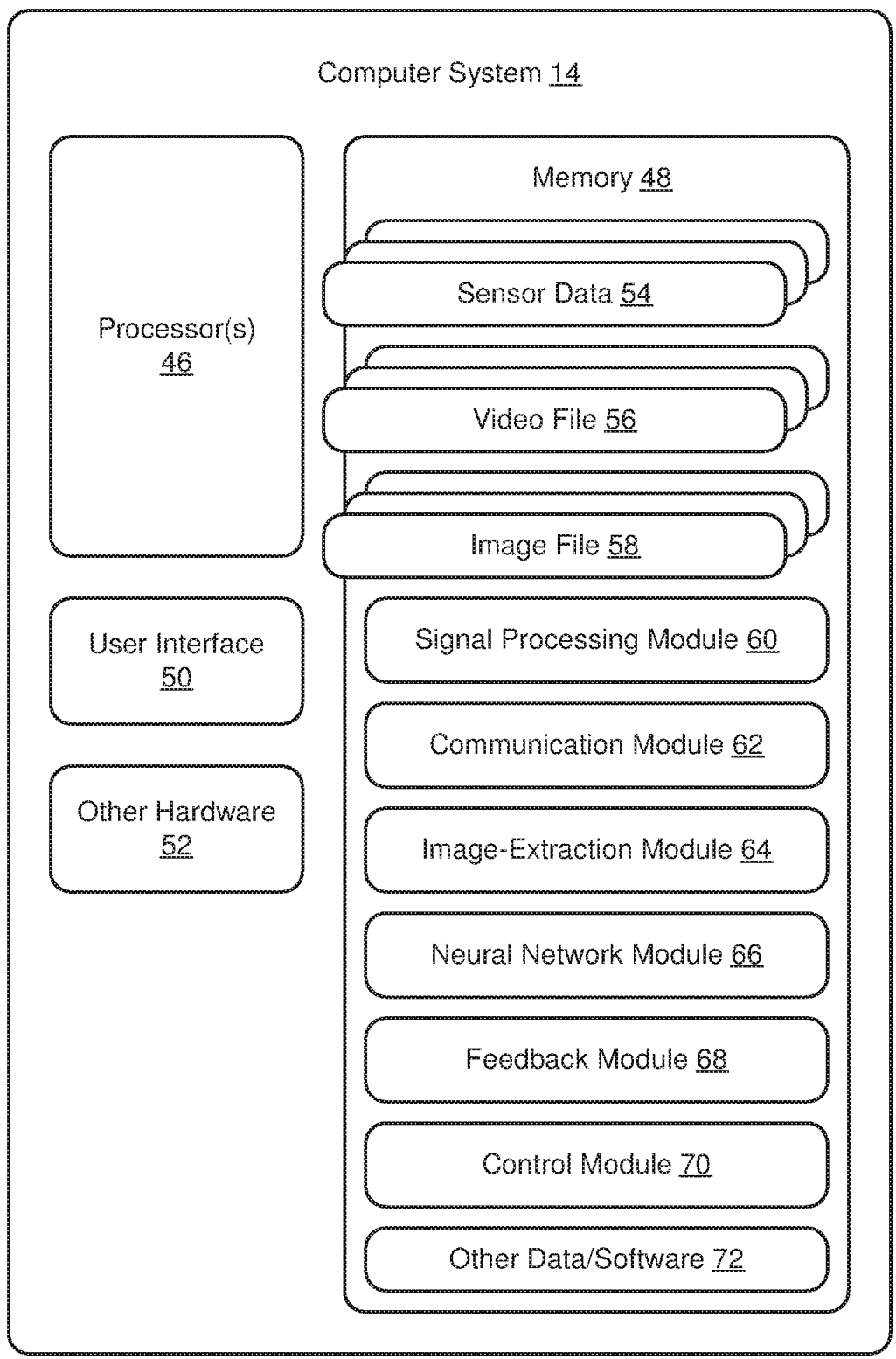
FIG. 3 is a schematic block diagram illustrating one embodiment of a system for controlling window transmittance in accordance with the present invention.

Referring to FIG. 3, a system 14 in accordance with the present invention may generate or collect information characterizing a lighting event or condition using signal processing, deep learning, or a combination thereof. A system 14 may accomplish this in any suitable manner. For example, a system 14 may be embodied as hardware, software, or some combination thereof.

In selected embodiments, a system 14 may include computer hardware and computer software. The computer hardware of a system 14 may include one or more processors 46, memory 48, one or more user interfaces 50, other hardware 52, or the like or a combination or sub-combination thereof. In certain embodiments, all or some subset of this computer hardware may be hardware already included as part of a vehicle 10. That is, all or some portion of the computer hardware may be multipurpose and perform tasks that are already associated with the operation of the vehicle 10. Alternatively, a system 14 in accordance with the present invention may be dedicated exclusively to controlling the transmittance of one or more windows 12.

The memory 48 of a system 14 in accordance with the present invention may be operably connected to the one or more processors 46 and store the computer software. This may enable the one or more processors 46 to execute the computer software. Thus, a system 14 may augment the functionality or features of a vehicle 10 by adding and/or modifying software, adding additional hardware to the vehicle 10, or a combination thereof.

A user interface 50 of a system 14 may enable an engineer, technician, driver, or the like to interact with, run, customize, or control various aspects of a system 14. A user interface 50 may enable a user to manually control (e.g., incrementally increase or decrease at the touch of a button) the transmittance of one or more windows 12, fully darken all windows 12 when leaving a corresponding vehicle 10 unattended, fully darken all windows 12 during a period of fully autonomous driving, or the like. In selected embodiments, a user interface 50 of a system 14 may include one or more buttons, keypads, keyboards, touch screens, pointing devices, or the like or a combination or sub-combination thereof. Alternatively, or in addition thereto, a user interface 50 may comprise one or more communication ports (e.g., plug in ports, wireless communication ports, etc.) through which one or more external computers or devices may communicate with a system 14 or one or more components thereof. For example, a user interface 50 may include a communication port through which a wireless override device associated with a police officer or the like may instruct a system 14 to maximize the transmittance of one or more (e.g., all) windows 12 of a vehicle 10 during a traffic stop, vehicle inspection, or the like.

In selected embodiments, the memory 48 of a system 14 may store (at least temporality) sensor data 54 (e.g., one or more segments of signal output by one or more sensors 26 carried on-board a vehicle 10), video 56 (e.g., one or more video files 56) collected or captured by one or more sensors 26 carried on-board a vehicle 10, one or more images files 58 containing, defining, or corresponding to one or more images captured by one or more sensors 26 or extracted from video collected or captured by one or more sensors 26, or the like or a combination or sub-combination thereof.

Additionally, the memory 48 may store one or more software modules. For example, the memory 48 may store a signal processing module 60, communication module 62, image-extraction module 64, neural network module 66, feedback module 68, control module 70, other data or software 72, or the like or a combination or sub-combinations thereof. Alternatively, one or more of the signal processing module 60, communication module 62, image-extraction module 64, neural network module 66, feedback module 68, and control module 70 may be embodied as hardware or comprise hardware components. Thus, while FIG. 3 shows the signal processing module 60, communication module 62, image-extraction module 64, neural network module 66, feedback module 68, and control module 70 as being software-only modules that are stored in memory 48, in actuality, one or more of these modules 60, 62, 64, 66, 68, 70 may comprise hardware, software, or a combination thereof.

A signal processing module 60 may enable a system 14 to receive and interpret signal output by one or more sensors 26. For example, the signal output by a light sensor 26 (e.g., a photovoltaic component 24 of a window 12, photodiode, photo transistor, camera operating or being used as a light sensor, or the like) may need to be amplified, filtered, sampled, converted, compared to one or more threshold values, or the like or a combination or sub-combination thereof in order to extract useful information therefrom or make decisions based thereon. Accordingly, such signal processing may be performed as needed by a signal processing module 60.

A communication module 62 may enable data such as one or more segments of sensor data 54, video files 56, image files 58, software components (e.g., one or more modules 60, 62, 64, 66, 68, 70 or updates thereto), information characterizing a lighting event, classifications (e.g., classification information output by the artificial neural network of a system 14), or the like or combinations of sub-combinations thereof to be passed (e.g., passed 28, 30, 36 via radio waves) into or out of a system 14 in accordance with the present invention. For example, a communication module 62 forming part of a system 14 carried on-board one vehicle 10b may enable that system 14 to receive or use information generated or collected by another vehicle 10a. Alternatively, or in addition thereto, a communication module 62 may enable a system 14 to receive an update to its neural network module 66. Accordingly, improvements developed off-board a vehicle 10 may be brought on-board as desired or necessary.

An image-extraction module 64 may extract one or more images from video captured by one or more sensors 26. For example, an image-extraction module 64 may extract one or more images (e.g., several images captured over a period of a few seconds or less) from a video file 56 that is stored in memory 48, video that is being output by a sensor 26, or the like. In selected embodiments, an image-extraction module 64 may store one or more images that are extracted thereby as images files 58 in memory 48.

A neural network module 66 may be, include, or support an artificial neural network programmed to perform or apply deep learning. The deep learning performed or applied by an artificial neural network may use one or more algorithms to model high-level abstractions in data corresponding to one or more images, other sensor data, and/or combinations thereof that are collected by the one or more sensors 26 connected to a system 14 in accordance with the present invention. In selected embodiments, this may be accomplished by using multiple processing layers comprising multiple non-linear transformations.

For example, an artificial neural network corresponding to a neural network module 66 may comprise feed-forward computational graphs with input nodes, hidden layers and output nodes. For classifications that involve images, pixel-values of an input image forming part of the classification may be assigned to input nodes, and then be fed through the network, passing a number of non-linear transformations. At the end of the computation, the output node may yield a value that corresponds to the class inferred by the neural network.

In order for an artificial neural network corresponding to a neural network module 66 to be able to distinguish between different classes, it needs to be trained based on examples. Accordingly, to create an artificial neural network that is able to classify a plurality of different occupant characteristics, occupant behaviors, lighting conditions, etc., a large collection of example images and other sensor data (e.g., hundreds to thousands for each type and/or level) having known (e.g., labeled) characteristics, behaviors, conditions, etc. must be used as training data. Thus, using backpropagation, an artificial neural network may be trained.

Once trained, an artificial neural network corresponding to a neural network module 66 may receive one or more inputs (e.g., data output by or corresponding to one or more sensors 26) and classify those inputs as having a particular numeric affinity (e.g., percentage "score") for each class for which the artificial neural network was trained. Accordingly, if an artificial neural network were trained on twenty different classes, then for one or more inputs, the artificial neural network may output twenty numeric scores. Each such score may be indicative of the affinity of the one or more inputs (or of the physical reality reflected by the one or more inputs) to a different class.

In a decisive or clear classification, the one or more inputs may show a strong affinity to one class and weak affinity to all other classes. In an indecisive or unclear classification, the one or more inputs may show no preferential affinity to any particular class. For example, there may be a "top" score for a particular class, but that score may be close to other scores for other classes.

Accordingly, in selected embodiments, a neural network module 66 may apply one or more threshold comparisons or tests to determine whether any particular classification is sufficiently decisive or clear so as to be acted or relied upon (e.g., whether the classification is sufficiently decisive or clear so as to alter the transmittance of one or more windows 12). For example, a neural network module 66 may test a classification to see if the separation between a top score and all other scores meets or satisfies a certain separation threshold.

In certain embodiments, an artificial neural network forming, supported by, or included within a neural network module 66 may operate on-board a vehicle 10 in a training mode or an implementation mode. In training mode, an artificial neutral network may train on multiple training images or sensor data corresponding to known classes. In implementation mode, an artificial neural network may analyze image data captured by one or more sensors 26 (e.g., a single image, multiple images, or multiple consecutive images extracted from video captured by a camera) and/or sensor data generated by or corresponding to one or more other sensors 26 (e.g., light sensors, thermometers, or the like) in order to classify a corresponding environment surrounding a vehicle 10 as being in one lighting condition or another for some period of time (e.g., until a subsequent image and/or sensor data is classified or over a period of about 1 second, 3 seconds, 5, seconds, 10 seconds, or the like).

Accordingly, an artificial neural network corresponding to a neural network module 66 may be trained while operating within or on the hardware of a system 14 carried on-board as part of the standard or optional equipment of a production vehicle 10. Alternatively, an artificial neural network corresponding to a neural network module 66 may be trained while operating within or on the hardware a non-production system 14 (e.g., an off-board system 14 in a computer laboratory, a non-production system 14 carried on-board a test vehicle 10 specifically for the purposes of training, or the like), then "cloned" or otherwise copied onto or imported within a production system 14 forming part of a production vehicle 10.

In certain embodiments, a neural network module 66 may be, include, or support a single, general purpose artificial neural network. That general purpose artificial neural network may receive all the available or desired inputs (e.g., all the data from an array of sensors 26 connected to a system 14) and output all the affinity scores for all the different classes. However, in other embodiments, a neural network module 66 may comprise, include, or support multiple, job-specific artificial neural networks or one or more artificial neural networks that process fewer that all the available inputs.

For example, in certain embodiments, a first, image-specific artificial neural network may classify image data corresponding to one or more sensors 26, while one or more other processing systems or methods may be applied to data or signal from one or more other sensors 26. Thus, the work of analysis and classification performed by a neural network module 66 may be divided up among one or more multiple artificial neural networks, other processing or analysis systems (e.g., signal processing modules 60), or combinations thereof.

One or more artificial neural networks in accordance with the present invention may be trained to recognize (e.g., produce affinity scores for) a certain, predetermined set of classes. The number of classes within such a set may vary between embodiments. In certain embodiments, the number of classes may be relatively few. For example, a set of classes may consist of as few as two classes (e.g., a first class corresponding to too much light being transmitted through a particular window 12 or group of windows 12 and a second class corresponding to too little light being transmitted through the particular window 12 or group of windows 12).

In other embodiments, the number of classes in a set may be significantly more. For example, a first subset of classes within a particular set may correspond to a driver wearing sunglass (e.g., at least one class corresponding to a driver wearing sunglasses and at least one class corresponding to a driver not wearing sunglasses); a second subset of classes within the set may correspond to a driver squinting (e.g., at least one class corresponding to a driver squinting and at least one class corresponding to a driver not squinting); a third subset of classes within the set may correspond to a driver using a hand to shade his or her eyes (e.g., at least one class corresponding to a driver using a hand to shade his or her eyes and at least one class corresponding to a driver not using a hand to shade his or her eyes); a fourth subset of classes within the set may correspond to ranges of skin pigmentation (e.g., at least two classes comprising skin pigmentation below a first level and skin pigmentation above a second level that is equal to or greater than the first level); a fifth subset of classes within the set may correspond to ranges of color value of clothing of an occupant (e.g., at least two classes of color value comprising value below a first level and value above a second level that is equal to or greater than the first level); a sixth subset of classes within a particular set may correspond to apparent occupant age (e.g., at least one class corresponding to an infant being an occupant of a vehicle 10 and at least one class corresponding to an infant not being an occupant of the vehicle 10); a seventh subset of classes within the set may correspond to ranges of incident radiant energy or flux (e.g., at least two classes comprising incident radian flux 16 below a first level and incident radian flux 16 above a second level that is equal to or greater than the first level); an eight subset of classes within the set may correspond to ranges of transmitted radiant energy or flux (e.g., at least two classes comprising transmitted radian flux 18 below a first level and transmitted radian flux 18 above a second level that is equal to or greater than the first level); or the like or any combination or sub-combination thereof.

In selected embodiments, different artificial neural networks may be applied to different subsets of classes. For example, a first artificial neural network may make classifications with respect to a first subset, a second artificial neural network may make classifications with respect to a second subset, etc.

Alternatively, a single artificial neural network may make all classifications with respect to a particular set of classes. In such embodiments, various permutations of the various elements of the various subsets may define the classes for which scores are generated. That is, the subsets within a particular set may overlap to at least some degree. For example, if a first subset of classes within a particular set corresponds to a driver wearing sunglass and a second subset of classes within the set corresponds to a driver using a hand to shade his or her eyes, there may be at least four classes scored by an artificial neural network. The four classes may include: (1) not wearing sunglasses and not shading eyes; (2) wearing sunglasses and not shading eyes; (3) not wearing sunglasses and shading eyes; and (4) wearing sunglasses and shading eyes.

The various classifications made by one or more artificial neural networks in accordance with the present invention may be designed to identify situations where a change in the transmittance of one or more windows 12 may be helpful or desirable. For example, in a given lighting condition, a driver wearing sunglasses may need or desire more transmittance through one or more windows 12 than a driver not wearing sunglasses. Accordingly, when an artificial neural network classifies a driving as wearing sunglass, a system 14 may be less aggressive in its tinting of one or more windows 12.

Other classifications may have other rationales. For example, when a driver squints, it may be an indication that less transmittance is needed or desired. When a driver uses a hand to shade his or her eyes, it may be an indication that less transmittance is needed or desired. When an occupant of a vehicle 10 has a lighter skin pigmentation, it may be an indication that he or she may be more sensitive to UV radiation and that less transmittance is needed or desired. When an occupant of a vehicle 10 is wearing darker clothing, which clothing tends to absorb rather than reflect radiant energy, it may be an indication that less transmittance is needed or desired. When an occupant is an infant, it may be an indication that he or she may be more sensitive to UV radiation and that less transmittance is needed or desired. When more incident radiant energy or flux reaches a window 12, it may be an indication that less transmittance is needed or desired. When more transmitted radiant energy or flux passes through a window 12, it may be an indication that less transmittance is needed or desired. Thus, a system 14 may use one or more classifications made by one or more artificial neural networks to determine a proper setting for the transmittance of one or more windows 12 in a particular situation or at a particular moment in time.

In selected embodiments, a feedback module 68 may be included within a system 14 to support or enable on-board training of an artificial neural network corresponding to a neural network module 66. A feedback module 68 may provide information to a neural network module 66 that indicates which class or condition corresponds to which sensor data. Thus, a feedback module 68 may enable a system 14 to generate training data on which to train (or improve the training of) a corresponding artificial neural network.

That is, in order to train an artificial neural network, training data of a known class may be analyzed by the artificial neural network. It may not be enough for a system 14 to have sensor data collected by one or more on-board sensors 26. The system 14 may also need to know which of that sensor data corresponds to one class and which corresponds to another. This additional information may be collected and provided by a feedback module 68.

For example, a feedback module 68 may note when a human driver deploys a sun visor, closes a shade portion of a sunroof, instructs a vehicle 10 to darken the tint of one or more windows 12, or the like. Accordingly, sensor data collected or captured at or near a time when any such action was taken may be "known" to correspond to a "too bright" condition. Similarly, a feedback module 68 may note when a human driver stows a sun visor, opens a shade portion of a sunroof, instructs a vehicle 10 to lighten the tint of one or more windows 12, or the like. Accordingly, sensor data collected or captured at or near a time when any such action was taken may be "known" to correspond to a "not too bright" condition.

A control module 70 may be programmed to request, initiate, or implement one or more actions or functions based on processing performed by a signal processing module 60, the classifications determined by a neural network module 66, or some combination thereof. For example, when a control module 70 determines from the data output by a signal processing module 60 that radiant energy incident on a rear window 12 is within a particular range, the control module 70 may set the tint of the rear window to a value consistent with (e.g., previously assigned to) that particular range. Similarly, when a control module 70 determines from the various affinity scores output by a neural network module 66 that a driver is wearing sunglasses, a control module may request, initiate, or implement changes to the transmittance of one or more windows 12 that are less aggressive (e.g., result in less tinting) than when the affinity scores indicate that the driver is not wearing sunglasses.

In selected embodiments, a control module 70 may control the voltage delivered to the transmittance components 22 of one or more windows 12. By controlling the voltage, a control module 70 may control the transmittance of the transmittance components 22 and, therefore, set the tint of those windows 12. In certain embodiments, a control module 70 may individually control multiple windows 12 (e.g., all windows) of a vehicle 10. Accordingly, a control module 70 may apply a different voltage to each of the multiple windows 12 in order to obtain a different transmittance or tint for each.

Alternatively, a control module 70 may individually control certain groups or classes of windows 12. For example, a windshield may be a first class of window 12, a sunroof may be a second class of window 12, and a rear window and all side windows may be a third class of window 12. Accordingly, the transmittance of the windshield may be controlled independent of all other windows 12, the transmittance of the sunroof may be controlled independent of all other windows 12, and the rear window and side windows may be controlled together.

In other embodiments, other groups or classes may be assigned. For example, in selected embodiments, a windshield may be a first class of window 12, a sunroof may be a second class of window 12, a rear window may be a third class of window 12, all windows on the driver's side of the vehicle 10 may be a fourth class of window 12, and all windows on the passenger's side of the vehicle 10 may be a fifth class of window 12. Accordingly, the transmittance of the windshield may be controlled independent of all other windows 12, the transmittance of the sunroof may be controlled independent of all other windows 12, the transmittance of the rear window may be controlled independent of all other windows 12, the transmittance of all windows on the driver's side of the vehicle 10 may be controlled together, and the transmittance of all the windows on the passenger's side of the vehicle 10 may be controlled together.

Figure 4:
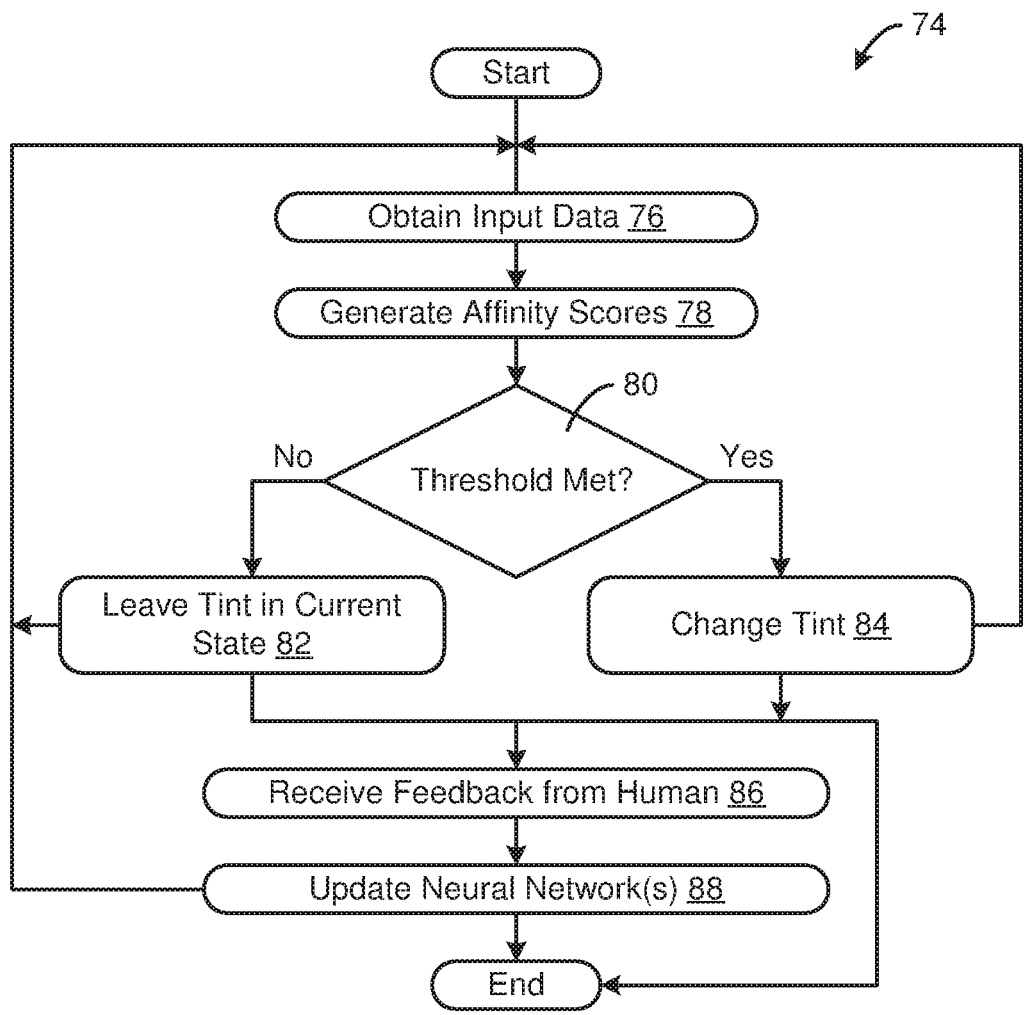
FIG. 4 is a schematic block diagram of one embodiment of a method for controlling window transmittance in accordance with the present invention.

Referring to FIG. 4, in selected embodiments, applying 74 one or more classification algorithms of an artificial neural network to image or other sensor data may begin with obtaining 76 the input data. Such input data may include one or more unclassified images and, if desired, other unclassified sensor data that pertain to (e.g., were all collected at or near) the same period of time. Thereafter, the input data may be fed to an artificial neural network that generates 78 affinity scores (e.g., percentages of confidence) for each class of a corresponding set.

For example, if an artificial neural network were trained to differentiate between two classes, then the artificial neural network may generate 78 two affinity scores. Specifically, the artificial neural network may output a first percentage indicative of the confidence that the input data corresponds to a first class and a second percentage indicative of the confidence that the input data corresponds to a second class.

Thereafter, a determination may be made 80 as to whether one or more applicable thresholds have been met. That is, depending on the magnitude of the various affinity scores (e.g., whether the percentage for one class is above a particular threshold, the percentages for all other classes are below a particular threshold, or both), the difference between the various affinity scores (e.g., whether the difference or separation between the percentage for one class and the percentages for all other classes is above a particular threshold), or the like or a combination thereof, the corresponding input data may be classified as one class or condition or the other.

For example, in a simplest case, a threshold may set at "50%." Accordingly, in a two class situation (e.g., wearing sunglasses or not wearing sunglasses), if one class tallies higher than the other, the threshold may be met. Alternatively, a threshold may be set at something higher than 50% (e.g., somewhere in the range of about 55% to about 85%). In such embodiments or situations, an overall determination 80 as to whether the input data is indicative of one class may not be settled by which class has the highest affinity score. Rather, like a higher burden of proof in a legal proceeding, the threshold may ensure that a classification does not just favor, but clearly or strongly favors one class over all others. Accordingly, one or more thresholds may be set to lower the number of false positives with respect to one or more classes.

If a determination 80 indicates that a first class or a "no indication of excessive or insufficient transmittance" condition is not present, a neural network module 66 or artificial neural network thereof may declare that the transmittance is neither excessive nor insufficient and a system 14 may take 82 one or more actions consistent with that condition. Such action may include leaving the transmittance or tint of one or more windows 12 how it is. A system 14 may also enter a holding pattern and wait some period of time (e.g., 1 second, 10 seconds, 30 seconds, 1 minute, 5 minutes, 10 minutes, or the like) before obtaining 76 new input data and starting the classification process again.

Conversely, if a determination 80 indicates that some other class or lighting condition within a particular set is present, a neural network module 66 or an artificial neural network thereof may declare that the particular lighting condition is present and a system 14 may take 84 one or more actions consistent with that condition. Such action may include increasing or decreasing the transmittance or tint of one or more windows 12. A system 14 may also enter a holding pattern and wait some period of time (e.g., 1 second, 10 seconds, 30 seconds, 1 minute, 5 minutes, 10 minutes, or the like) before obtaining 76 new input data and starting the classification process again. Accordingly, a system 14 in accordance with the present invention may, while a corresponding vehicle 10 is running, continuously or periodically process data from one or more sensors 26 to determine a current lighting condition.

In selected embodiments, after one or more actions are taken 82, 84 by a system 14, a process 74 may end or cycle back and begin again. Alternatively, a process 74 may continue in order to utilize human feedback to improve a system 14. For example, in certain embodiments, a system 14 may at some point within a process 74 in accordance with the present invention receive 86 feedback from a human (e.g., a human driver). This feedback may indicate which class or condition corresponds to which input data. Accordingly, the feedback and the corresponding input data may become training data used to update 88 and/or retrain an artificial neural network. Alternatively, or in addition thereto, such feedback may be used to update 88, adjust 88, or fine tune 88 one or more thresholds used in the process 74. For example, if, after automatically adjusting a transmittance of one or more windows 12 to a particular level, an occupant manually increases or decreases that transmittance, a system 14 may note that change and take the preferences of the occupant into accounts in the future.

In selected processes in accordance with the present invention, image data may be processed using an artificial neural network, while other sensor data may be processing using other signal processing techniques. For example, one or more images (e.g., one or more images captured by a forward facing camera 26a, rearward facing camera 26b, occupant-facing camera 26c, and/or point-of-view camera 26d) may be obtained 76 and processed by an artificial neural network, while light-sensor data (e.g., data characterizing light incident on one or more windows 12, data characterizing light passing through one or more windows 12, or the like or a combination thereof) may be obtained 76 and processed by filtering, sampling, threshold comparisons, or the like or a combination or sub-combination thereof.

In certain embodiments, once obtained 76, one or more images may be analyzed using sophisticated computer vision techniques involving recurrent neural networks to model and predict a level of driver visibility. For example, based on one or more images obtained 76 from an point-of-view camera 26d, a system 14 may predict if a driver would want to increase or decrease the transmittance of a particular window 12 (e.g., of a windshield).

In selected embodiments, a system 14 may obtain 76 and use a sequence of images to classify a lighting condition. This may involve applying adaptable threshold techniques that operate successfully with just a couple of images. Accordingly, the images obtained 76 may be taken with different camera parameters (e.g., depth of field, exposure settings, etc.) and be fed to an artificial neural network, which may generate 78 an affinity score corresponding to each class of a plurality of classes. Sometime thereafter, one or more thresholds may be compared to the affinity scores to determine 80 an appropriate lighting condition (e.g., determine 80 whether it is appropriate to change a transmittance or tint of one or more windows 12).

Figure 5:
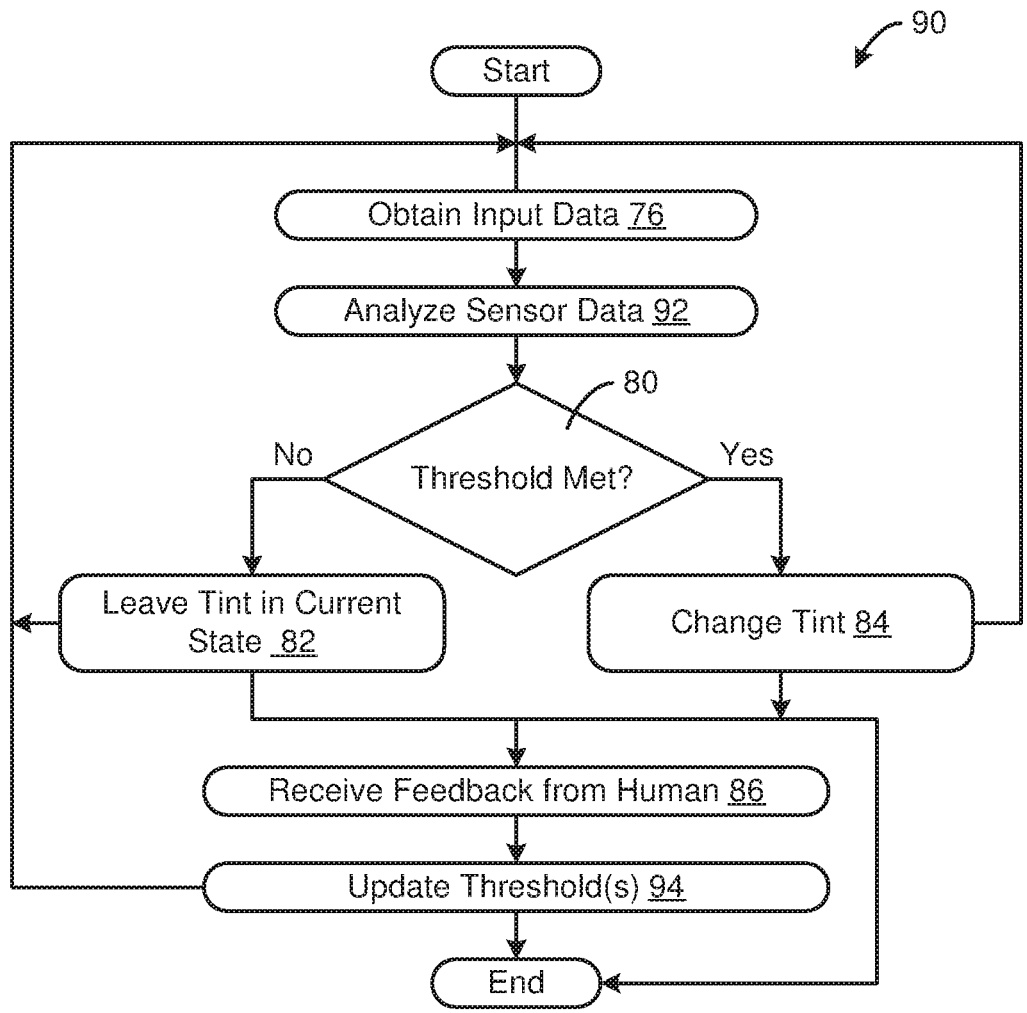
FIG. 5 is a schematic block diagram of an alternative embodiment of a method for controlling window transmittance in accordance with the present invention.

Referring to FIG. 5, in selected processes in accordance with the present invention, a system 14 may operate using signal processing techniques and not apply any deep learning techniques or algorithms. For example, in the illustrated process 90, one or more images and/or other light data may be obtained 76 and analyzed 92 (e.g., amplified, filtered, sampled, converted, compared to one or more threshold values, or the like or a combination or sub-combination thereof) in some desired manner.

At some point, one or more thresholds may be compared to the input data to determine 80 an appropriate lighting condition (e.g., determine 80 whether it is appropriate to declare a particular lighting condition). Accordingly, if the determination 80 corresponding to the input data indicates a particular lighting condition, a system 14 may take action 82, 84 consistent with that condition (e.g., leave the transmittance or tint of one or more windows 12 where it is, increase the transmittance of one or more windows 12, decrease the transmittance of one or more windows 12, or the like).

In selected embodiments, after one or more actions are taken 82, 84 by a system 14, a process 90 may end or cycle back and begin again. Alternatively, a process 90 may continue in order to utilize human feedback to improve a system 14. For example, in certain embodiments, a system 14 may at some point within a process 90 in accordance with the present invention receive 86 feedback from a human (e.g., a human driver). Such feedback may be used to update 94, adjust 94, or fine tune 94 one or more thresholds used in the process 90. For example, if, after automatically adjusting a transmittance of one or more windows 12 to a particular level, an occupant manually increases or decreases that transmittance, a system 14 may note that change and take the preferences of the occupant into accounts in the future.

In processes 74, 90 in accordance with the present invention, the weight given to certain sensor data or classifications of certain sensor data may not be equal to the weight given to other sensor data or classifications based on other sensor data. For example, a classification indicating that a driver is shading his or her eyes with his or her hand may be strong evidence that the transmittance for a particular window 12 (e.g., windshield) is too high. Accordingly, in selected embodiments or situations, when a system 14 determines that a driver is shading his or her eyes with his or her hand, that determination may be weighted more heavily than light data characterising a general light level within a cabin of a vehicle 10. In selected embodiments, such differential weightings may be "baked in" with the training of an artificial neural network. In other embodiments, such differential weightings may be manual programmed based on experience or expectations.

Figure 6:
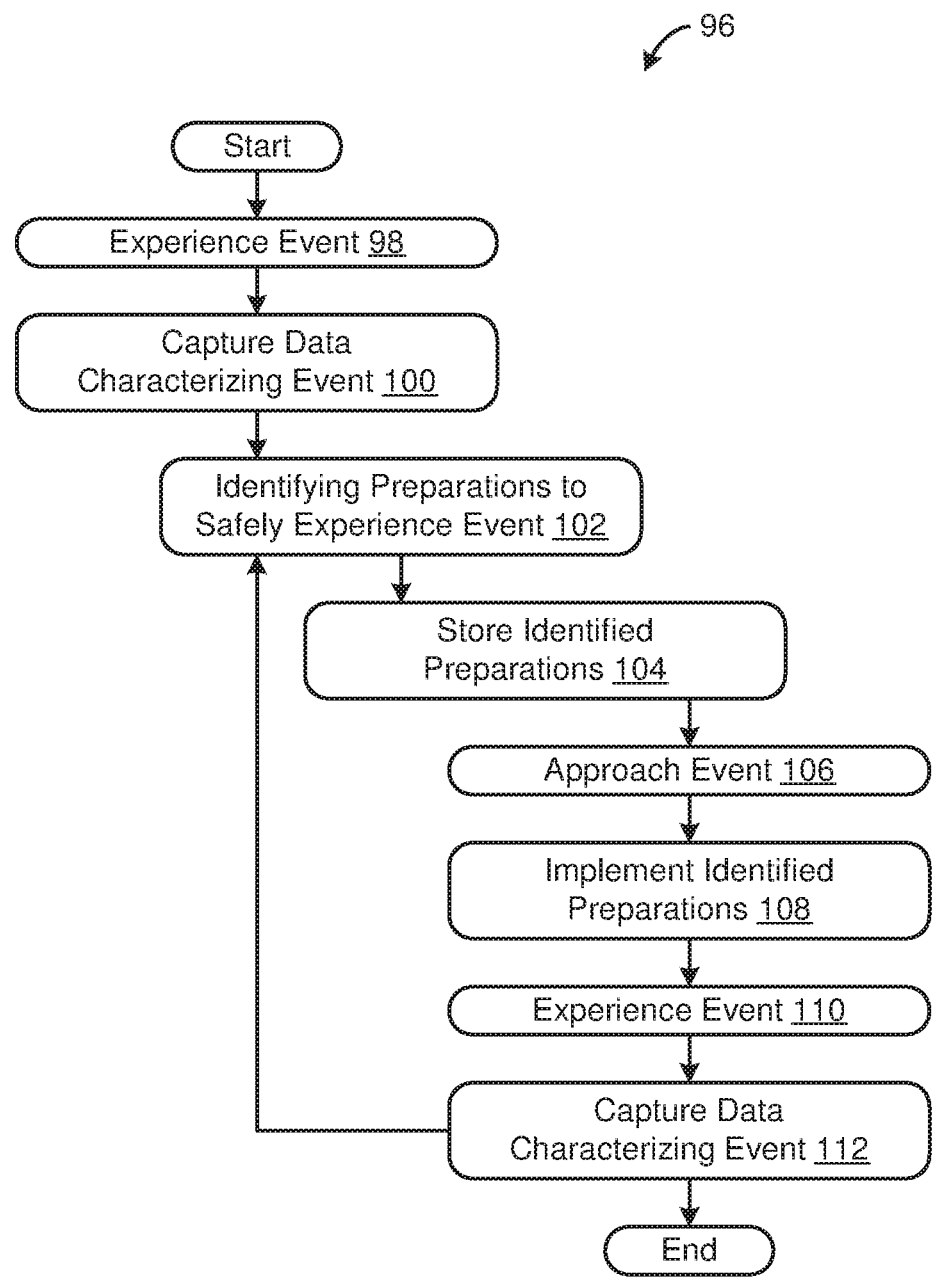
FIG. 6 is a schematic block diagram of a method for using past experiences to prepare for future events in accordance with the present invention.

Referring to FIG. 6, in certain embodiments, changes in transmittance of one or more windows 12 may not be instantaneous. Additionally, the collection and processing of data from one or more sensors 12 may not be instantaneous. Accordingly, there may be an unwanted delay between a lighting change in an environment of a vehicle 10 and the completion of a change in transmittance that addresses the lighting change. Thus, systems 14 in accordance with the present invention may be configured to minimize that delay.

Alternatively, or in addition thereto, in selected embodiments, one or more systems 14 may leverage or use past experience to prepare in advance for certain lighting conditions or events.

For example, a vehicle 10 may experience a particular lighting condition or event (e.g., an abrupt transition at the summit of a hill from complete shadow to a direct view of the sun through a windshield) while traveling in a particular direction, on a particular road, at a particular location, and at a particular time of day. Accordingly, a system 14 within the vehicle 10 may use its experience with that lighting condition or event to prepare should the vehicle 10 later find itself traveling in the particular direction, on the particular road, near the particular location, and near the particular time of day. Alternatively, or in addition thereto, a system 14 of one vehicle 10a may share its experience (e.g., via a communication system 32, computer system 40, directly passing 28 data, or the like) with one or more other vehicles 10b so that they may also be prepared.

In certain embodiments, a method 96 of preparing for one or more lighting conditions or events may begin when a lighting condition or event is experienced 98 by a first vehicle 10a and its corresponding system 14. Thereafter or concurrently therewith, the system 14 may capture 100 data characterizing the lighting condition or event. The data captured 100 may include certain sensor outputs, direction of travel, GPS location, time of day, or the like or a combination or sub-combination thereof.

Based on the data captured 100, certain preparations to safely experience or pass through the lighting condition or event may be identified 102. For example, if the event were an abrupt transition at the summit of a hill from complete shadow to a direct view of the sun through a windshield, the preparations identified 102 may be the need to lower the transmittance of a windshield before (e.g., just before) reaching the summit of the hill when summiting the hill in the same direction at or near (e.g., within an hour or two of) the same time of day. The preparations so identified 102 may be stored 104 (e.g., in memory 48 of one or more systems 14, in memory of a computer system 40, or the like or a combination thereof) so as to be available for use in the future.

Accordingly, at a later time, as the first vehicle 10a (or a second vehicle 10b that is connected to the first vehicle 10a via a communication system 32, computer system 40, directly communication 28, or the like) approaches 106 in direction, location, time, etc. the lighting condition or event, a system 14 (e.g., a control module 70 of a system 14) of the first vehicle 10a (or the second vehicle 10b) may implement 108 one or more of the preparations that were identified 102 and stored 104. In this manner certain adverse effects associated with the lighting condition or event may be ameliorated as the lighting condition or event is again experienced 110.

In selected embodiments, the data characterizing this second or additional experience with the lighting condition or event may also be captured 112. Accordingly, this second or additional experience may also be used to identify 102 or further improve preparations to safely experience or pass through the lighting condition or event. Thus, with time and experience, one or more vehicles 10a, 10b may generate a database of preparatory actions that may be taken in various locations and at various times.

Figure 7:
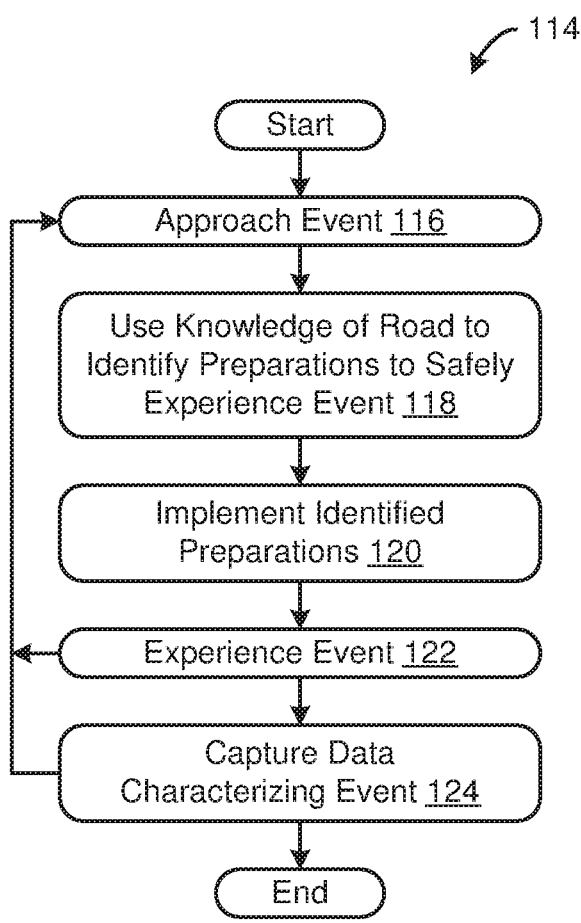
FIG. 7 is a schematic block diagram of a method for using computerized knowledge of a road and/or driving environment to prepare for future events in accordance with the present invention.

Referring to FIG. 7, in selected embodiments, one or more systems 14 may leverage or use pre-prepared computerized knowledge of a road and/or driving environment that is available through GPS data, electronic horizon data, map data (e.g., road maps, high definition maps that include features like buildings that may reflect light or otherwise affect lighting conditions, or the like or combinations thereof), wireless weather data, or the like or a combination or sub-combination thereof to prepare in advance for certain lighting conditions or events. Accordingly, in certain embodiments, an alternative method 114 of preparing for one or more lighting conditions or events may begin when as a vehicle 10 approaches 116 in direction, location, time, etc. a terrain or environment likely to produce a predictable lighting condition or event.

During such an approach, a system 14 of the vehicle 10 may use 118 computerized knowledge of a road and/or driving environment to identify preparations that may be helpful to safely experience or pass through the anticipated or predicted lighting condition or event. These preparations may then be implemented 120. In this manner certain adverse effects associated with the lighting condition or event may be ameliorated as the lighting condition or event is experienced 122. This process may be repeated as a vehicle 10 approaches 116 other predicted lighting conditions or events.

For example, using 118 computerized knowledge of a road, driving environment (e.g., direction of travel, time of day, solar patterns, cloud cover, etc.), or the like, a system 14 (e.g., a control module 70 of a system 14) may predict that an approaching summit of a hill will produce an abrupt transition from complete shadow to a direct view of the sun through a windshield. Accordingly, the system 14 (e.g., the control module 70) may identify an appropriate time to lower the transmittance of a windshield. Thus, the transmittance of the windshield may be lowered before (e.g., just before) reaching the summit of the hill.

In selected embodiments, data characterizing this experience with the lighting condition or event may be captured 124. Accordingly, this experience may also be used to identify or further improve preparations to safely experience or pass through this or other similar lighting conditions or events. Thus, with time and experience, one or more vehicles 10a, 10b may generate a database of preparatory actions that may be taken in various locations and at various times.

The flowcharts in FIGS. 4-7 illustrate the architecture, functionality, and operation of possible implementations of systems, methods, and computer-program products according to various embodiments in accordance with the present invention. In this regard, each block in the flowcharts may represent a module, segment, or portion of code, which comprises one or more executable instructions for implementing the specified logical function(s). It will also be noted that each block of the flowchart illustrations, and combinations of blocks in the flowchart illustrations, may be implemented by special purpose hardware-based systems that perform the specified functions or acts, or combinations of special purpose hardware and computer instructions.

It should also be noted that, in some alternative implementations, the functions noted in the blocks may occur out of the order noted in the Figures. In certain embodiments, two blocks shown in succession may, in fact, be executed substantially concurrently, or the blocks may sometimes be executed in the reverse order, depending upon the functionality involved. Alternatively, certain steps or functions may be omitted if not needed.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," "selected embodiments," "certain embodiments," etc., indicate that the embodiment or embodiments described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

What is claimed is:

1. A system comprising:
   a vehicle having a window with variable transmittance;
   a camera secured to the vehicle and outputting image data corresponding to one or more images taken of an occupant within the vehicle;
   an artificial neural network running on hardware carried onboard the vehicle;
   the artificial neural network classifying, based on the image data, the occupant's perception of radiant flux transmitted through the window, the classifying comprising
      generating an affinity score for each of a plurality of classes of occupant configuration using the image data as an input, each of the plurality of classes corresponding to a different occupant perception of radiant flux, and
      selecting, from among the plurality of classes, a class of occupant configuration associated with the occupant based on an affinity score for the class of occupant configuration satisfying at least one threshold;
   at least one controller carried onboard the vehicle; and
   the at least one controller changing the transmittance of the window based on the occupant perception of radiant flux corresponding to the selected class of occupant configuration.

2. The system of claim 1, wherein the window is a windshield of the vehicle.

3. The system of claim 2, wherein the plurality of classes of occupant configuration comprises a first class corresponding to an occupant squinting and a second class corresponding to an occupant not squinting.

4. The system of claim 2, wherein the plurality of classes of occupant configuration comprises a first class corresponding to wearing sun glasses and a second class corresponding to not wearing sun glasses.

5. The system of claim 2, wherein the plurality of classes of occupant configuration comprises a first class corresponding to an occupant shading his or her eyes with a hand and a second class corresponding to an occupant not shading his or her eyes with a hand.

6. The system of claim 1, further comprising at least one light sensor connected to the vehicle, the at least one light sensor outputting light data characterizing ambient light in an environment surrounding the vehicle.

7. The system of claim 6, wherein the generating further comprises generating the affinity score for each of the plurality of classes of occupant configuration using the image data and the light data as inputs.

8. A system comprising:
   a vehicle having a window with variable transmittance;
   a camera secured to the vehicle and outputting image data corresponding to one or more images taken of an occupant within the vehicle;
   an artificial neural network running on hardware carried onboard the vehicle;
   the artificial neural network classifying, based on the image data, the occupant's response to radiant flux transmitted through the window, the classifying comprising
      generating an affinity score for each of a plurality of classes of occupant response using the image data as an input, each of the plurality of classes corresponding to a different response to radiant flux, and
      selecting, from among the plurality of classes, a class of occupant response associated with the occupant based on an affinity score for the class of occupant response satisfying at least one threshold;
   at least one controller carried onboard the vehicle; and
   the at least one controller changing the transmittance of the window based on the occupant response to radiant flux corresponding to the selected class of occupant response.

9. The system of claim 8, wherein the occupant is the driver of the vehicle.

10. The system of claim 8, wherein the window is a windshield of the vehicle.

11. The system of claim 10, wherein the plurality of classes of occupant response comprises a first class corresponding to an occupant squinting and a second class corresponding to an occupant not squinting.

12. The system of claim 10, wherein the plurality of classes of occupant response comprises a first class corresponding to wearing sun glasses and a second class corresponding to not wearing sun glasses.

13. The system of claim 10, wherein the plurality of classes of occupant response comprises a first class corresponding to an occupant shading his or her eyes with a hand and a second class corresponding to an occupant not shading his or her eyes with a hand.

14. A method comprising:
   receiving, by a computer system carried on-board a vehicle, image data captured by an in-cabin camera oriented toward an occupant of the vehicle;
   receiving, by an artificial neural network running on the computer system, the image data as an input;
   classifying, by the artificial neural network, the occupant's response to radiant flux transmitted through a window of the vehicle, the classifying comprising
      generating affinity scores for each of a plurality of classes of occupant response based on the input, each of the plurality of classes corresponding to a different occupant response to radiant flux, and
      selecting, from among the plurality of classes, a class of occupant response associated with the occupant based on an affinity score for the class of occupant response satisfying at least one threshold; and
   changing, by the computer system, the transmittance of the window based on the occupant response to radiant flux corresponding to the selected class of occupant response.

15. The method of claim 14, wherein the window is a windshield of the vehicle.

16. The method of claim 15, wherein the plurality of classes of occupant response comprises a first class corresponding to an occupant squinting and a second class corresponding to an occupant not squinting.

17. The method of claim 15, wherein the plurality of classes of occupant response comprises a first class corresponding to wearing sun glasses and a second class corresponding to not wearing sun glasses.

18. The method of claim 15, wherein the plurality of classes of occupant response comprises a first class corresponding to an occupant shading his or her eyes with a hand and a second class corresponding to an occupant not shading his or her eyes with a hand.

19. The method of claim 18, further comprising at least one light sensor connected to the vehicle, the at least one light sensor outputting light data characterizing ambient light in an environment surrounding the vehicle.

20. The method of claim 19, wherein the generating further comprises generating the affinity score for each of the plurality of classes of occupant response using the image data and the light data as inputs.

\* \* \* \* \*